United States Patent [19]

Zimmermann et al.

[11] 4,342,961
[45] Aug. 3, 1982

[54] APPARATUS FOR MEASURING THE MUZZLE VELOCITY V-NULL OF A PROJECTILE FIRED FROM A WEAPON

[75] Inventors: Jakob Zimmermann, Pfäffikon; Willi Kocher, Zürich, both of Switzerland

[73] Assignee: Werkzeugmaschinenfabrik Oerlikon-Bührle AG, Zürich, Switzerland

[21] Appl. No.: 235,660

[22] Filed: Feb. 17, 1981

[30] Foreign Application Priority Data

Mar. 11, 1980 [CH] Switzerland ............... 1896/80

[51] Int. Cl.³ ............................................. G01P 3/66
[52] U.S. Cl. ................................... 324/179; 368/108
[58] Field of Search ............... 324/179, 178; 73/167; 368/108; 346/38

[56] References Cited

U.S. PATENT DOCUMENTS 2,691,761 10/1954 Smith, Jr. .
3,024,453 3/1962 Ransom ..................... 324/179 X
3,659,201 4/1972 Vogelsang .

FOREIGN PATENT DOCUMENTS 950700 7/1974 Canada .
423320 4/1967 Switzerland ................ 73/167
965077 7/1964 United Kingdom .

Primary Examiner—Stanley T. Krawczewicz
Attorney, Agent, or Firm—Werner W. Kleeman

[57] ABSTRACT

The measuring apparatus enables measuring the muzzle velocity $V_o$ of projectiles, especially sabot projectiles, wherein the sabot disintegrates immediately after departure out of the muzzle of the weapon barrel. For this purpose two measuring coils, by means of which there can be measured the muzzle velocity of the projectiles, are secured to a sleeve member which prevents disintegration of the sabot prior to the $V_o$-measurement.

8 Claims, 2 Drawing Figures

APPARATUS FOR MEASURING THE MUZZLE VELOCITY V-NULL OF A PROJECTILE FIRED FROM A WEAPON

BACKGROUND OF THE INVENTION

The present invention relates to a new and improved construction of apparatus for measuring the muzzle velocity $V_o$ of a projectile fired from a weapon or a gun, especially a sabot projectile. The measuring apparatus is secured to the muzzle or mouth of the weapon barrel and possesses two measuring coils arranged in spaced relationship from one another in such a manner that the measuring coil axes essentially coincide with the lengthwise axis of the weapon barrel.

A measuring apparatus of this type is known to the art, wherein both of the measuring coils are attached by means of a rod-like support at the weapon barrel in such a manner that the projectile departing out of the mouth or muzzle of the weapon barrel travels through both of the measuring coils. Since, however, the sabot of a sabot projectile, during its exit out of the barrel muzzle, immediately detaches from the projectile body or projectile and begins to disintegrate or break-up, the parts of the sabot are propelled against the aforementioned two measuring coils of the apparatus for measuring the muzzle velocity. Such parts of the sabot which are propelled against the measuring coils rebound towards the projectile and degrade the precise trajectory or flight path of the projectile. Additionally, the measurement of the muzzle velocity of the projectile is appreciably impaired or even rendered useless due to the parts of the sabot impacting against the measuring coils.

Prior art constructions of projectile measuring apparatuses have been disclosed in U.S. Pat. No. 2,691,761, granted Oct. 12, 1954, U.S. Pat. No. 3,659,201, granted Apr. 25, 1972, Canadian Pat. No. 950,700, granted July 9, 1974 and British Pat. No. 965,077, published July 29, 1964.

SUMMARY OF THE INVENTION

Therefore, with the foregoing in mind it is a primary object of the present invention to provide a new and improved construction of apparatus for measuring the muzzle velocity of a projectile fired from a weapon in a manner not afflicted with the aforementioned drawbacks and limitations of the prior art constructions heretofore discussed.

Another and more specific object of the present invention aims at the provision of a new and improved construction of a measuring apparatus for measuring the muzzle velocity of a projectile which is not afflicted with the aforementioned drawbacks, and therefore is particularly suitable for measuring the muzzle velocity of sabot projectiles, and wherein the measuring coils are arranged such that no parts of the disintegrating sabot can strike against the measuring coils.

Yet a further significant object of the present invention is to provide an improved construction of muzzle velocity measuring apparatus for projectiles which is relatively simple in construction and design, extremely reliable in operation, not readily subject to breakdown or malfunction, and provides highly accurate and reliable muzzle velocity measurements.

Now in order to implement these and still further objects of the invention, which will become more readily apparent as the description proceeds, the measuring apparatus of the present development is manifested by the features that it comprises a sleeve member which has essentially the same internal diameter as the weapon barrel and whose outer or external diameter is essentially of the same size as the internal diameter of the measuring coils. These measuring coils are arranged at both opposed ends of the sleeve member. Advantages of the inventive apparatus are realised by virtue of the fact that the muzzle velocity of sabot projectiles can be measured with the same accuracy as other projectiles devoid of any sabot. Further, parts of the disintegrating sabot do not impact against the measuring coils of the measuring apparatus, and the measuring coils are better protected than heretofore was the case from the aggressive propellant gases.

It is also within the teachings of the invention to protect the measuring coils, preferably through the use of sealing rings, against the action of aggressive propellant gases. Further, a muzzle brake, viewed in the direction of firing, preferably is arranged forwardly of the apparatus for the measurement of the muzzle velocity of the projectile, that the parts of this measuring apparatus preferably are interconnected with one another by a bayonet connection or joint and are attached with the aid of threads or the like at the mouth or muzzle of the weapon barrel.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
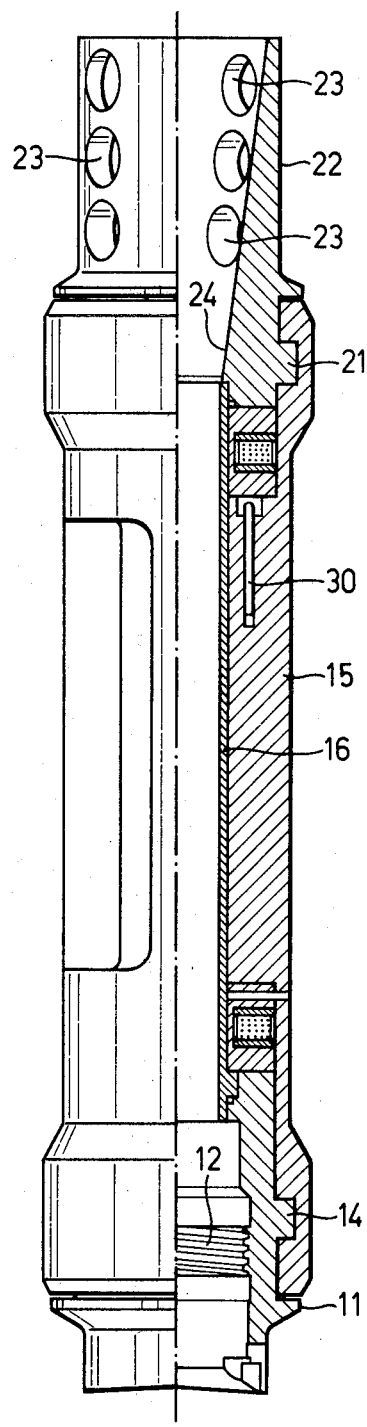
FIG. 1 is a longitudinal sectional view through an exemplary embodiment of apparatus for the $V_o$-measurement of a projectile fired from a weapon and illustrating part of the weapon barrel.
Figure 2:
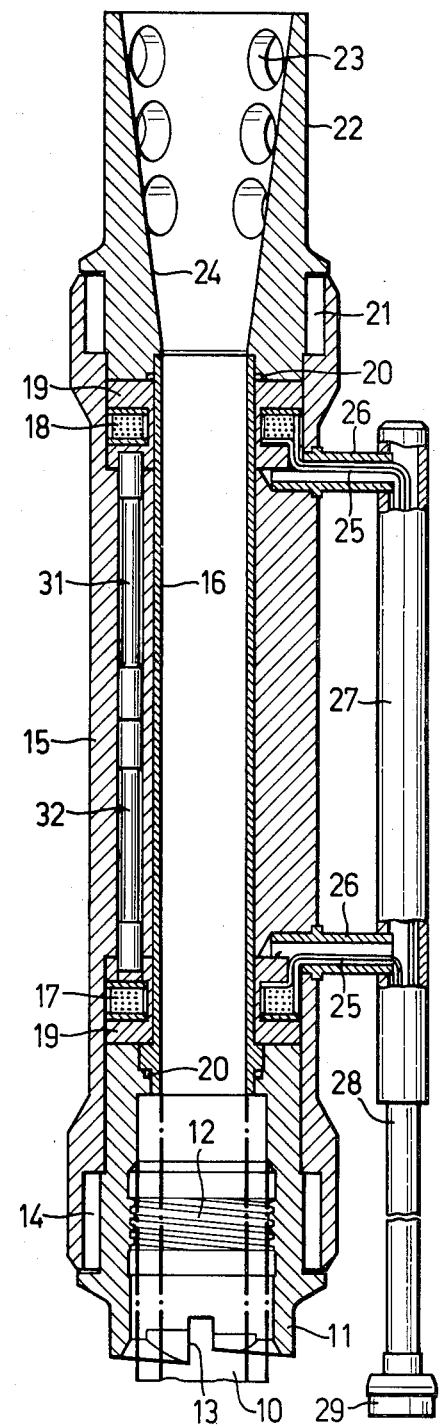
FIG. 2 is a further longitudinal sectional view through the arrangement of FIG. 1 in a plane disposed at right angles to the first longitudinal sectional view of FIG. 1.

Describing now the drawings, according to the showing of FIGS. 1 and 2 the inventive $V_o$-measuring apparatus will be seen to be secured to the muzzle or mouth of a weapon barrel 10 which only has been indicated in phantom lines and contains a connection piece or element 11. This connection element 11 is provided with internal threads 12 and can be threaded onto complementary but not particularly illustrated external threads of the weapon barrel 10. A slot 13 at the rear end of the connection element 11 enables securing the connection element 11 upon the weapon barrel 10 against unintentional rotation. At the connection element 11 there is attached with the aid of a bayonet joint or connection 14 or equivalent fastening device a tube or barrel member 15 which preferably is fabricated of steel. Placed internally of this tube or barrel member 15 is a sleeve member 16 formed of a nonmagnetisable material. At both ends of the sleeve member 16 there are arranged internally of the tube 15 a respective electrical measuring coil 17 and 18. Both of the measuring coils 17 and 18 are embedded in a related protective ring member 19 formed of titanium and having a substantially U-shaped cross-sectional configuration. To protect the measuring coils 17 and 18 against the action of the aggressive propellant gases there is further arranged a respective sealing ring 20 at both ends of the sleeve member 16. These sealing rings or seals 20 prevent that propellant gases can penetrate between the sleeve member 16 and the tube or barrel member 15. At the front end of the tube or tube member 15 there is secured with the aid of, for instance, a bayonet connection 21 or equivalent fastening device a muzzle brake 22. This muzzle brake 22 possesses a conical bore 24 and has a number of radial bores 23 through which the propellant gases can escape into the surroundings, and thus, exerts in conventional manner a braking action, i.e. partially takes-up the recoil of the weapon barrel.

According to the illustration of FIG. 2 connection wires 25 of both of the measuring coils 17 and 18 are guided through two sleeves 26 arranged radially with respect to the weapon lengthwise axis. At both of these sleeves 26 there is secured a tube or pipe 27 directed essentially parallel to the weapon axis. Through the tube 27 there are guided the connection wires or lines 25 into a cable 28 which is attached at the rear end of the tube 27 and possesses at its rear end a coupling element 29.

Since the entire measuring apparatus is heated by the hot propellant gas there is beneficially provided a temperature feeler or sensor 30 in the wall of the tube or barrel member 15. A not particularly illustrated connection wire of the temperature feeler 30 is likewise guided through the sleeve member 26 and the tube or pipe 27 into the cable 28.

Having now had the benefit of the description of the exemplary embodiment of measuring apparatus its mode of operation will be now considered and is as follows:

If a sabot projectile moves out of the muzzle of the weapon, such as a cannon barrel 10, into the sleeve member 16 then the sleeve member 16 prevents detachment of the sabot from the projectile or projectile body. The sabot and the projectile body first can separate from one another after departure out of the sleeve member 16 and the muzzle brake 22. However, the measurement of the muzzle velocity $V_o$ of the projectile occurs during such time as the projectile is propelled through the sleeve member 16 of the $V_o$-measuring device, i.e. in other words before the sabot detaches from the projectile. Impairment of the $V_o$-measurement by the sabot which is in the process of detaching or has already detached from the projectile, is therefore prevented. When the projectile along with the sabot travels through the first measuring coil 17, then as is well known in this technology there is induced a signal voltage or measuring signal in this measuring coil 17 which is delivered by the connection wire or line 25 to a not particularly illustrated but conventional evaluation device. Upon passage of the projectile through the second measuring coil 18 there is induced in the same manner as was the case for the first measuring coil 17 a second signal voltage or measuring signal which is likewise delivered to the evaluation device by means of the connection wires 25. From the time difference between both of the signals and from the spacing of both measuring coils 17 and 18 from one another it is then possible to compute in conventional manner the velocity with which the projectile moves through both of the measuring coils 17 and 18.

Since the measuring apparatus is heated and elongated by the action of the hot propellant gases the spacing between both of the measuring coils 17 and 18 changes. With the aid of a temperature feeler or sensor 30 it is possible to take into account the temperature-dependent spacing of both measuring coils 17 and 18 during the computation of the muzzle velocity of a projectile.

So that both of the measuring coils 17 and 18 do not turn relative to one another i.e. remain in the desired relative rotational position with respect to one another, there are secured two bolts 31 and 32 or equivalent anti-rotating securing means in the wall of the tube or barrel member 15, these bolts 31 and 32 extending into not particularly referenced bores of the protective rings 19 formed of titanium. This arrangement also facilitates the assembly of the measuring apparatus.

While there are shown and described present preferred embodiments of the invention, it is to be distinctly understood that the invention is not limited thereto, but may be otherwise variously embodied and practiced within the scope of the following claims.
ACCORDINGLY,

What we claim is:

1. An apparatus for measuring the muzzle velocity of a projectile fired out of a weapon having a weapon barrel containing a lengthwise axis, especially a sabot projectile, wherein the measuring apparatus is capable of being secured to the muzzle of the weapon barrel, comprising:
   two measuring coils;
   each of said measuring coils having a measuring coil axis;
   said two measuring coils being arranged in spaced relationship from one another such that the measuring coil axes substantially coincide with the weapon barrel axis;
   a sleeve member having opposed ends;
   said sleeve member possessing an internal diameter which is essentially the same as the internal diameter of the weapon barrel;
   said sleeve member having an external diameter which is essentially the same as the internal diameter of the measuring coils; and
   one of the measuring coils being arranged at the one opposed end of the sleeve member and the other measuring coil at the other opposed end of the sleeve member.

2. The apparatus as defined in claim 1, wherein:
   a respective sealing ring is arranged at each opposed end of the sleeve member in order to protect the measuring coils against the action of propellant gases.

3. The apparatus as defined in claim 1, wherein:
   said measuring apparatus has a front end region; and
   a muzzle brake arranged at the front end region of said measuring apparatus.

4. The apparatus as defined in claim 3, further including:
   a connection element adapted to be connected to the muzzle of the weapon by means of threading;
   a barrel member;
   means for connecting one end of said barrel member with said connection element;
   means for connecting the other end of said barrel member with said muzzle brake; and
   said sleeve member being arranged internally of said barrel member.

5. The apparatus as defined in claim 4, wherein:
   each of said connecting means comprise bayonet-type connection means.

6. The apparatus as defined in claim 1, further including:
   protective rings in which there are arranged both of said measuring coils; and
   each of said protective rings having a substantially U-shaped cross-sectional configuration for receiving a related one of the measuring coils.
7. The apparatus as defined in claim 6, wherein:
   each of said protective rings is formed of titanium.
8. The apparatus as defined in claim 4, further including:
   temperature feeler means arranged in a wall of said barrel member in order to enable taking into account the temperature of the measuring apparatus during computation of the muzzle velocity of the projectile.

* * * * *